Patented Nov. 30, 1948

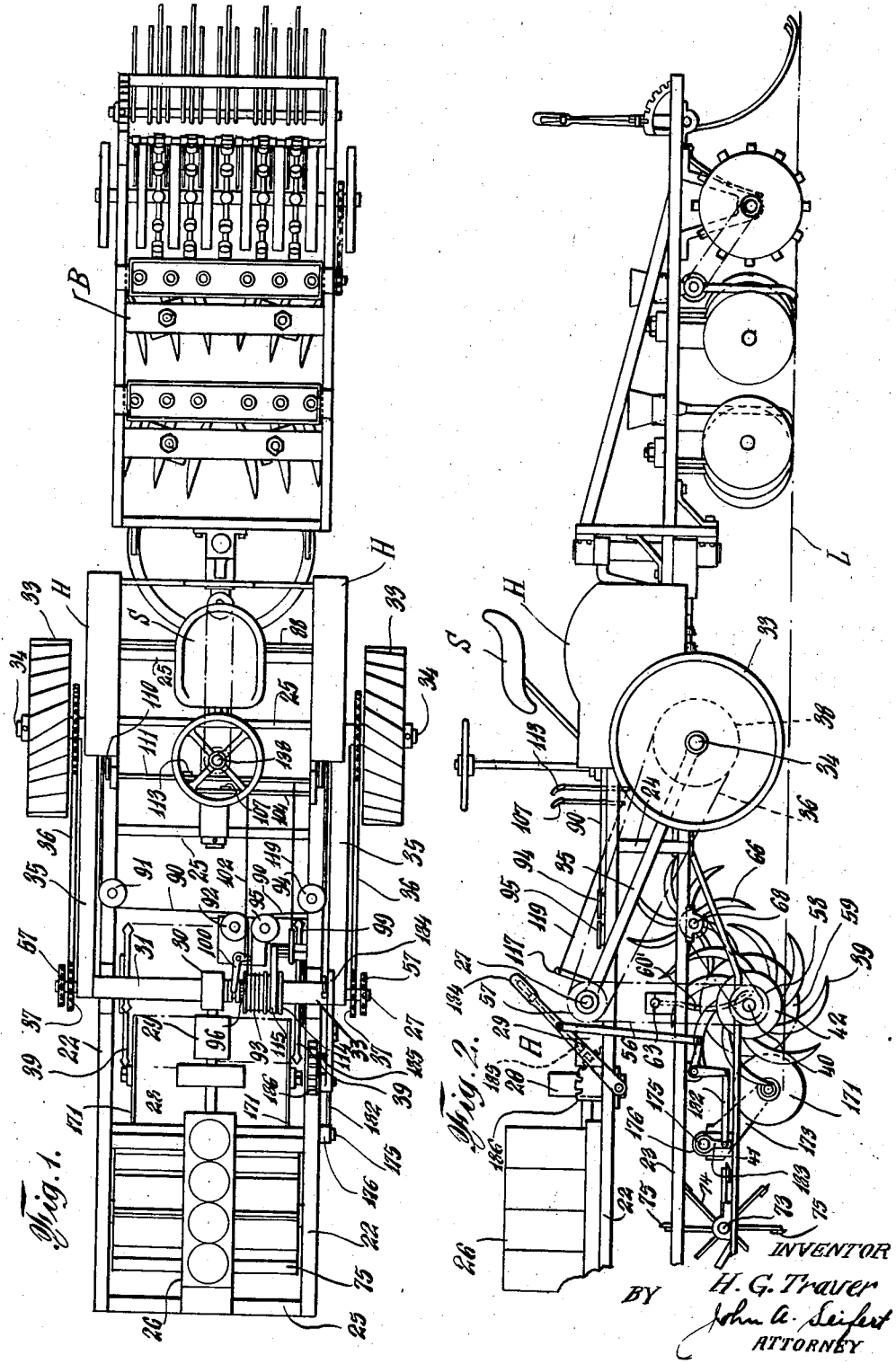

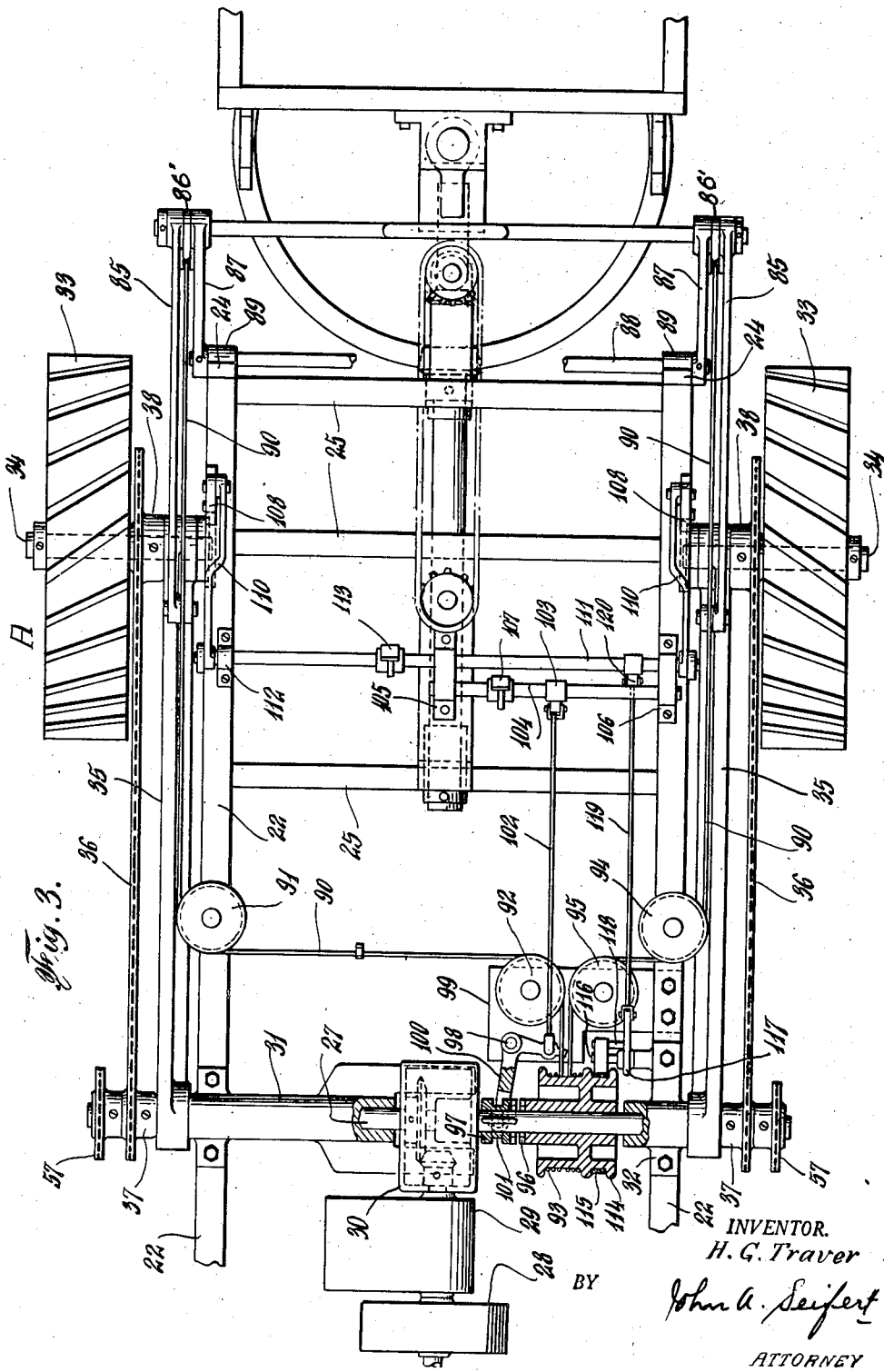

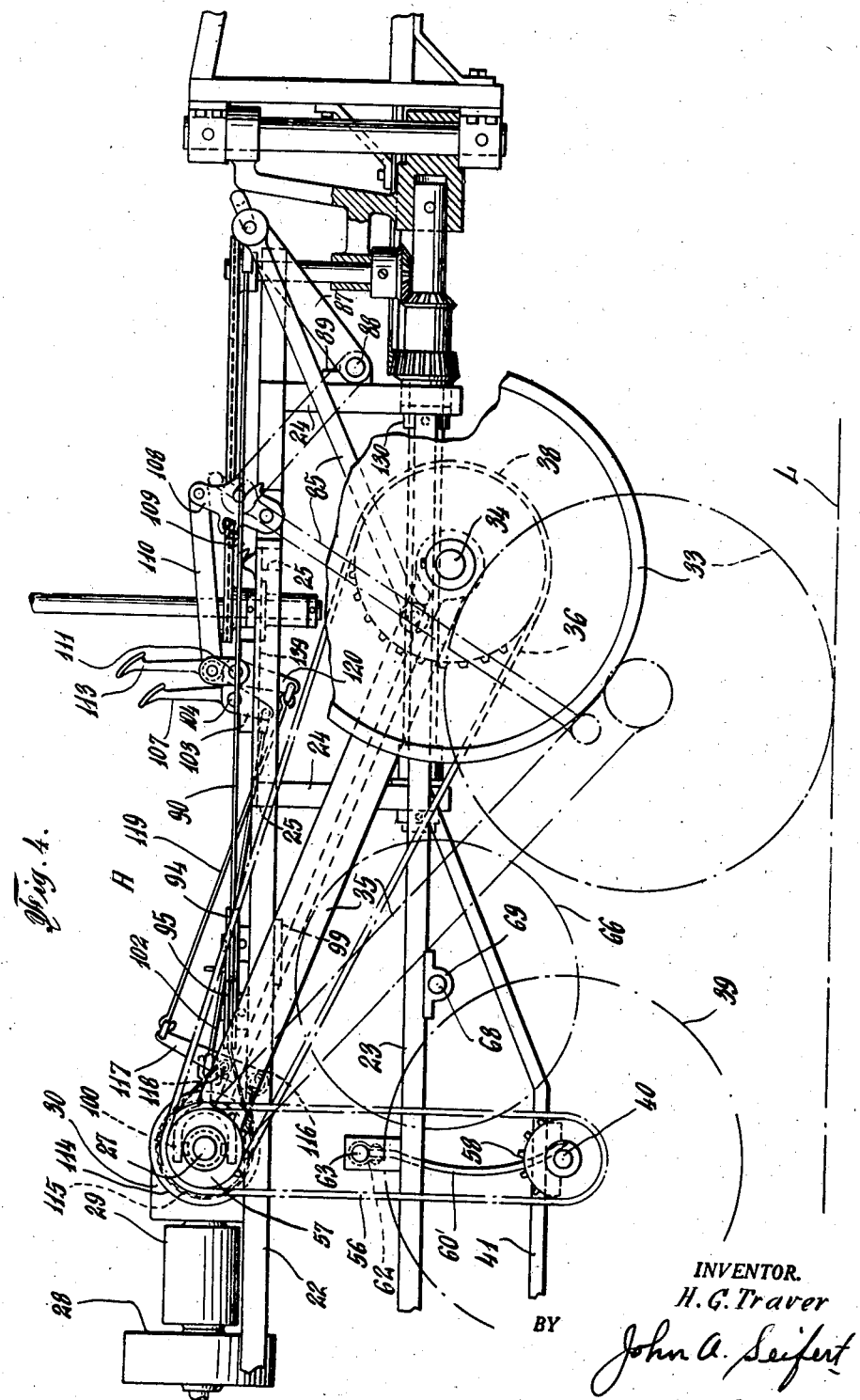

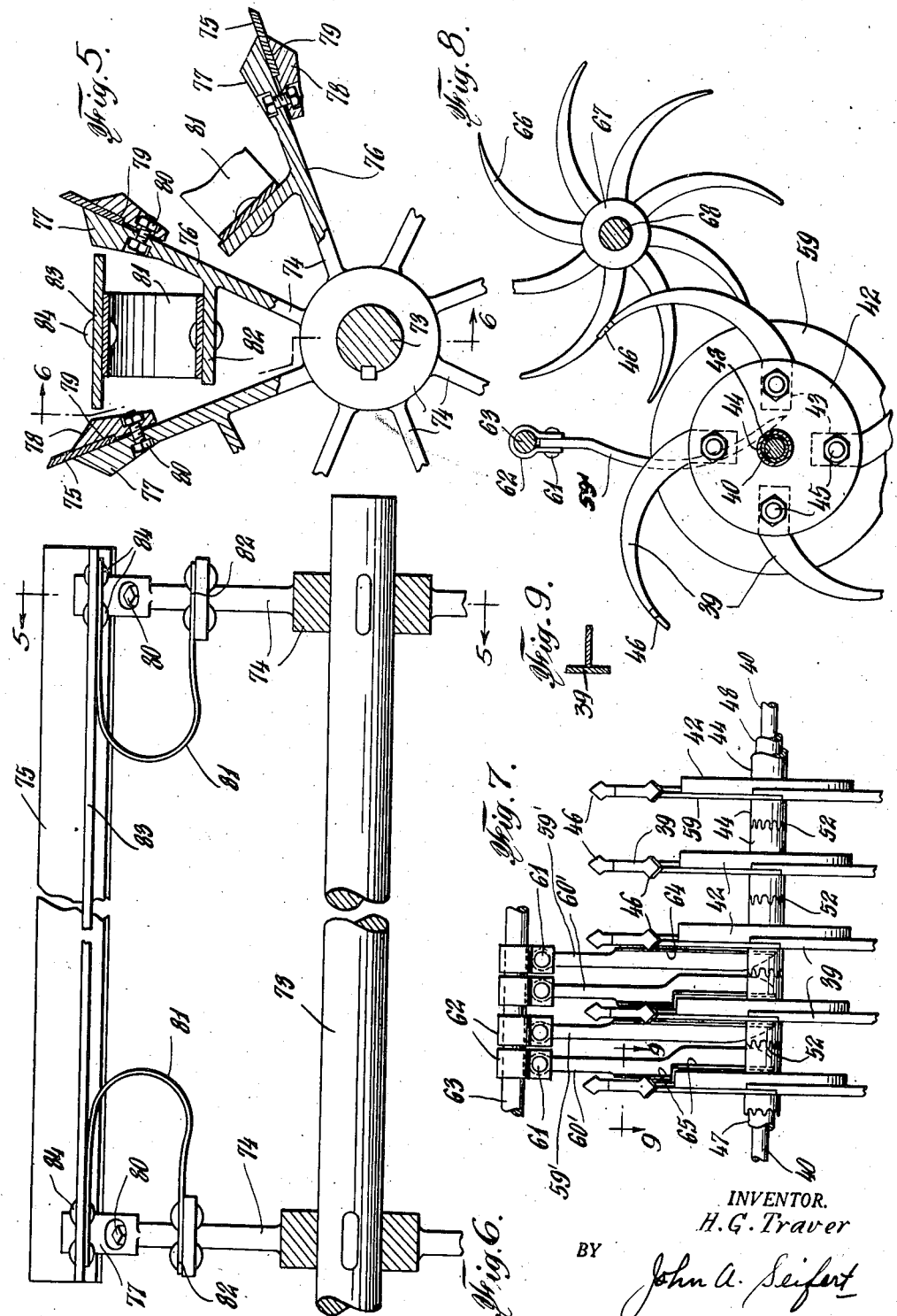

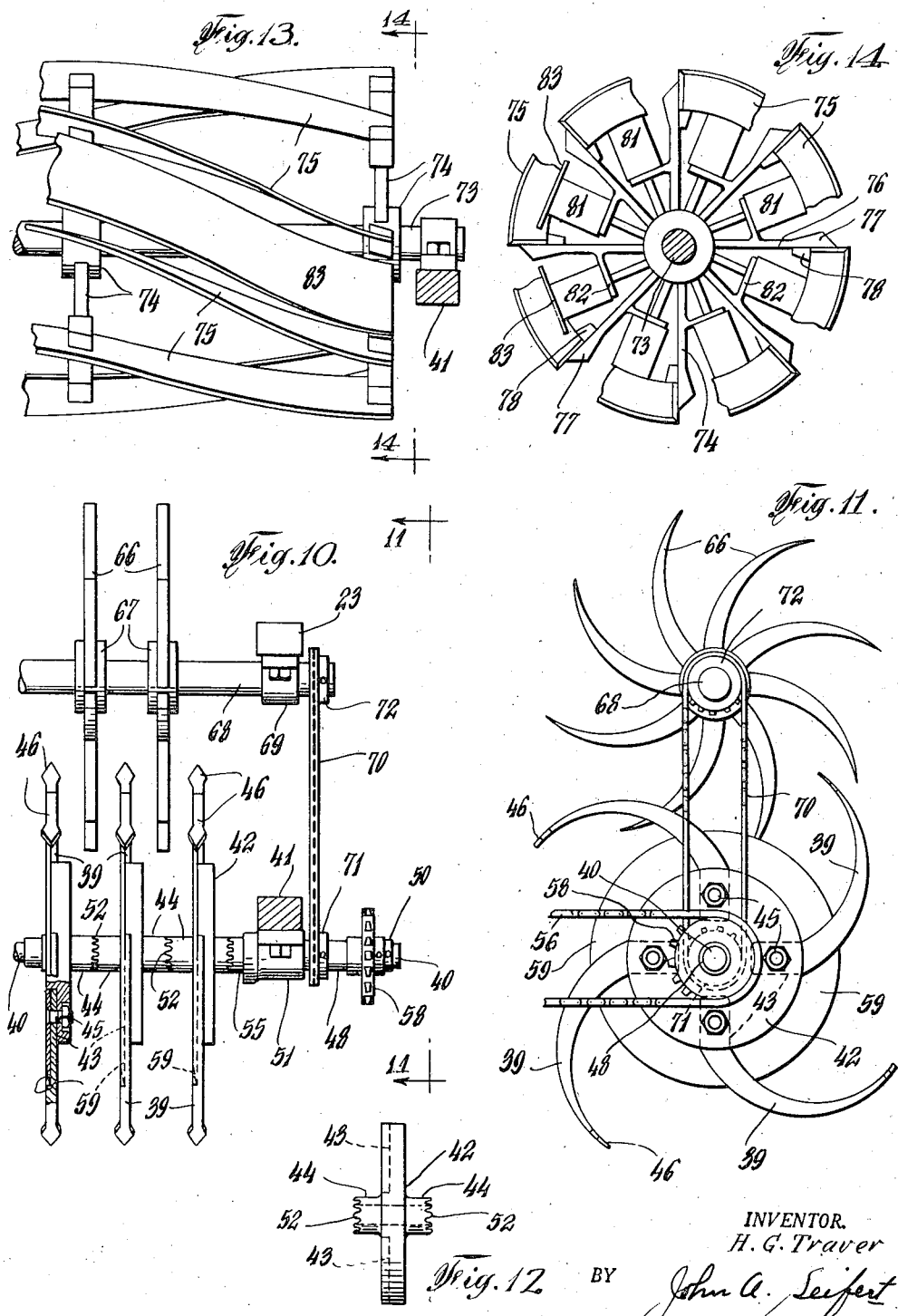

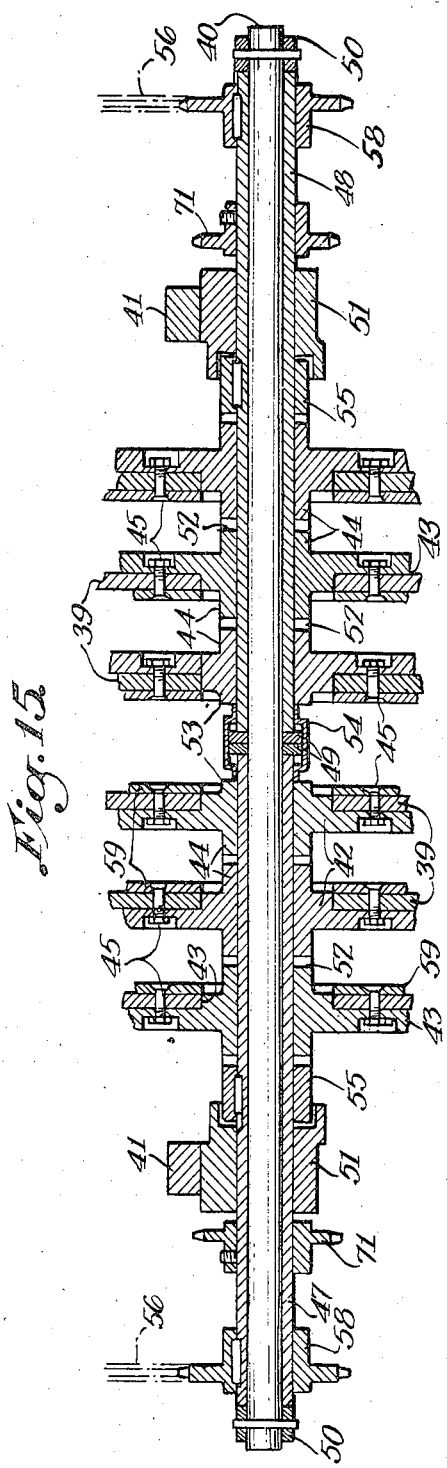

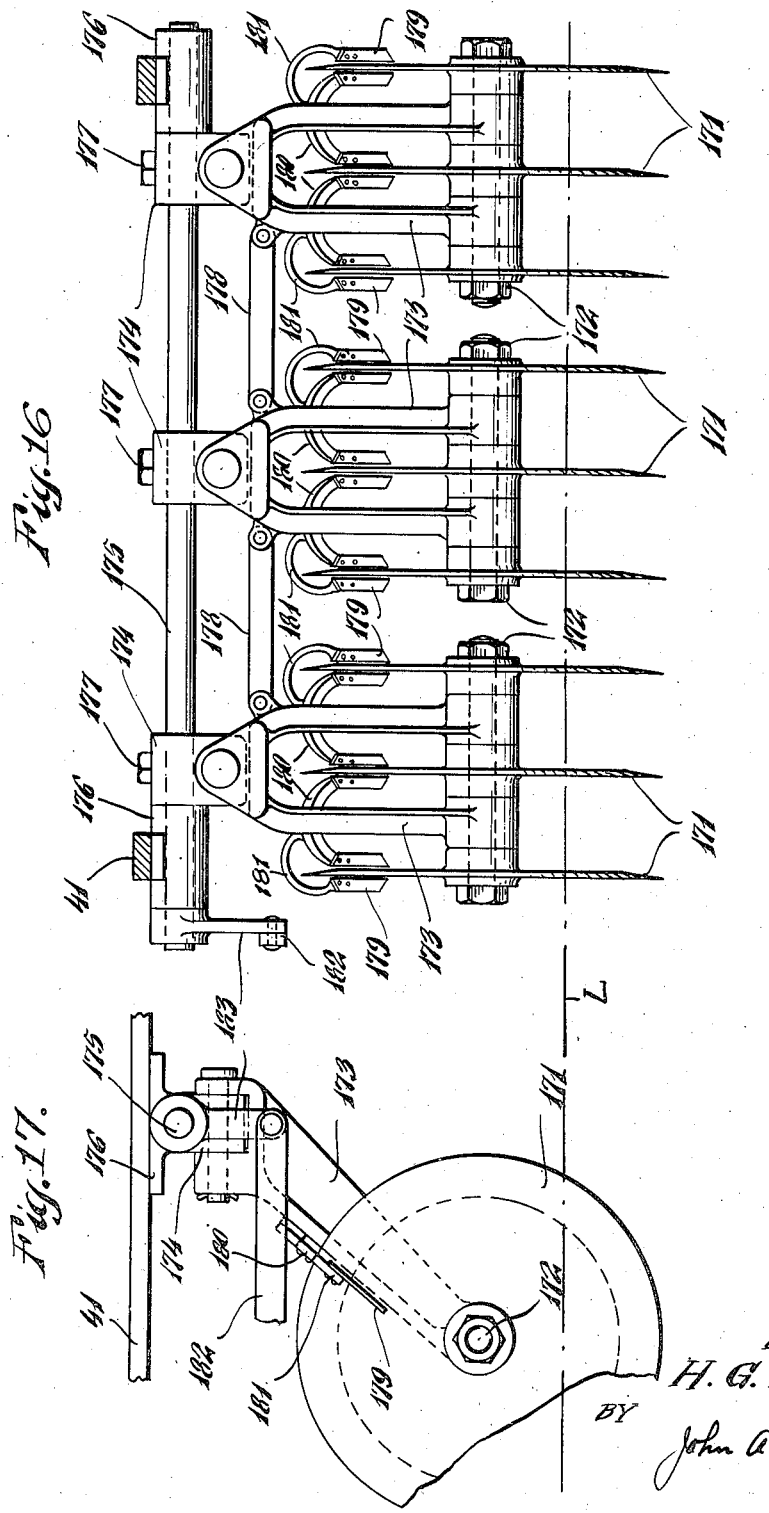

2,455,148

UNITED STATES PATENT OFFICE 2,455,148

MOTOR-DRIVEN ROTARY DIGGING APPARATUS

Harry G. Traver, Cranford, N. J.

Original application March 31, 1944, Serial No. 528,937. Divided and this application April 28, 1945, Serial No. 590,765

12 Claims. (Cl. 97—40)

This invention relates to agricultural apparatus for breaking, working and tilling the land or ground and preparing the same for seeding and raising of crops, and particularly to a tractor section and means to raise and lower traction wheels of said tractor section and actuate land working and tilling means carried by the tractor section into and out of working position, which were divided out of my copending application Serial No. 528,937 filed March 31, 1944.

It is an object of the invention to provide in land working and tilling apparatus of this charactor a tractor section having a supporting structure for a shaft carrying digger blades and power means carried by the supporting structure operatively connected to and rotating the shaft with the digger blades, and traction wheels driven from the power means and carried by means pivotally mounted on and adapted to support the supporting structure, and means to connect said traction wheel carrying means to and disconnect the same from the power means to lower the traction wheels and elevate the supporting structure to support the supporting structure by the traction wheels with the land working digger blades out of engagement with the ground, and propel the apparatus by the traction wheels, and raise the traction wheels, and lower the supporting structure to engage the land working digger blades with and cause said digger blades to enter the ground to a predetermined depth to work the land and propel the apparatus.

Another object of the invention is to provide in land working and tilling apparatus of this character means rotatably carried by the supporting structure of the tractor section forwardly of the land working digger blades to cut and reduce the size of vegetation, such as green manure, stalks and trash to facilitate the mixing and working of such material into the soil by the digger blades, and means carried by said cutter means operative by cut vegetation and other material accumulating on said cutter means to clear such material from said cutter means.

Other objects and advantages of the invention will hereinafter appear.

In the drawings accompanying and forming a part of this application, there is shown land working and tilling apparatus embodying the invention, wherein Figure 1 is a plan view of the same.

Figure 2 is a side elevation looking at the bottom of Figure 1.

Figure 3 is a plan view, on an enlarged scale, of the tractor section of the apparatus, partly in section, to show the means to connect the traction wheel carrying means to the power means to raise the traction wheels and support the supporting structure of the tractor section by the land breaking and loosening digger blades, and to lower the traction wheels and raise the supporting structure with the land breaking and loosening blades out of engagement with the ground.

Figure 4 is a side elevation of the tractor section of the apparatus looking at the bottom of Figure 3 and showing the traction wheels in dotted lines lowered in engagement with the land and supporting the tractor section with the digger blades out of engagement with the ground and showing in full lines the traction wheels raised out of supporting position.

Figure 5 is a fragmentary cross sectional view of part of the green manure and trash cutting means taken on the line 5—5 of Figure 6 looking in the direction of the arrows and showing the means for removing from the cutting means cut green manure and other foreign substances accumulated thereon.

Figure 6 is a sectional view taken on the line 6—6 of Figure 5 looking in the direction of the arrows.

Figure 7 is a front elevational view of a portion of the digger blades for breaking and loosening the land mounted on supporting and rotating shafts therefor and showing scrapers for scraping soil and other foreign substances from the blades and cutters associated therewith.

Figure 8 is a view looking at the right of Figure 7 and also showing in connection therewith means to clear foreign substances from the land breaking and loosening blades.

Figure 9 is a cross sectional view of one of the land breaking and loosening blades, the section being taken on the line 9—9 of Figure 7.

Figure 10 is an elevational view of an end portion of the shaft carrying the land breaking and loosening blades and means for removing from the blades foreign substances accumulated thereon and showing means for driving the latter from the blade carrying shaft.

Figure 11 is a view looking at the right of Figure 10 from line 11—11.

Figure 12 is an elevational view of a hub member on which the digger blades are fixed adapted to be independently mounted on the operating shaft therefor and arranged to operatively couple together juxtaposed blade carrying hubs.

Figure 13 is a view of an end portion of a modified green manure and trash cutter shown in Figures 5 and 6.

Figure 14 is a sectional view taken on the line 14—14 of Figure 13 looking in the direction of the arrows and showing means mounted on carrying arms for the green manure and trash cutters for removing from the cutters green manure and other foreign substances accumulated thereon.

Figure 15 is a longitudinal sectional view to show the rotatable mounting of hollow shafts upon which the hubs carrying the land breaking and loosening blades and cutter disks are mounted to rotate therewith.

Figure 16 is a rear elevational view of another part of the green manure and trash cutting means supported by the tractor section between the green manure and trash cutting means shown in Figures 5, 6, 13 and 14, and the digger blades.

Figure 17 is a view looking at the right hand side of Figure 16.

The embodiment of the invention illustrated in the drawings for carrying out the invention comprises a tractor section, designated in a general way by A in Figures 1, 2, 3 and 4, and a trailer section designated in a general way by B in Figures 1 and 2, and said sections pivotally connected to have adjustment one relative to the other on a vertical axis intersecting the longitudinal centers of the sections, as hereinafter fully described.

The tractor section includes a frame consisting of parallelly superposed side members 22, 23, secured in superposed relation by upright members 24 and in lateral spaced relation by transverse members 25. As shown, the tractor section is propelled by power means, partly shown in a general way as an internal combustion engine at 26 supported upon the transverse members connecting the upper side frame members 22, and said engine operatively connected to a drive shaft 27 through a clutch and change speed mechanism, shown in a conventional manner at 28 and 29, respectively. The clutch is provided with the usual means for engaging and disengaging the clutch, and the change speed mechanism is enclosed in a housing and provided with the usual actuating means for operatively connecting different elements thereof to rotate the output shaft at different speeds. The output shaft of the change speed mechanism is connected to the shaft 27 by a bevel pinion fixed on said output shaft meshing with a bevel gear fixed on the drive shaft, said pinion and gear connection being enclosed in a box or casing mounted upon the frame, as shown at 30 in Figure 3. The drive shaft 27 is journaled in the sleeve of a bearing member 31 and a bearing member 32 fixed upon the upper side frame members 22 with the opposite ends of the shaft projecting from opposite sides of the frame.

A pair of traction wheels 33 are connected to the frame to permit of the raising and lowering of the frame and traction wheels relative to each other. For this purpose the traction wheels are loosely mounted on the opposite end portions of a shaft 34 carried at one end of a pair of lever arms 35 disposed at the opposite sides of the frame and shown as loosely mounted on drive shaft 27. The traction wheels are rotated from the drive shaft by sprocket chains 36 passing around sprocket wheels 37 fixed on the projecting end portions of the drive shaft and sprocket wheels 38 fixed on the traction wheels.

Means to break and loosen the land or ground, shown in dot and dash lines at L, are rotatably carried below the frame forwardly of the traction wheels, and shown as comprising sets of radial digging blades 39 spaced circumferentially about and longitudinally of a shaft 40 extending transversely of and below the frame, and shown as journaled in bearings 51 mounted on a sub-frame 41 fixed to and suspended below the lower side members 23 of the frame, as shown in Figures 2 and 4. Each set of digging blades consists of four blades although a greater or less number may be utilized in each set with the blades mounted on and circumferentially spaced 90 degrees from each other about a disk portion of hub members 42 by engaging one end of the blades in recesses 43 in one face of the hub disks extending radially inwardly from the periphery toward a pair of tubular portions 44 extending axially from the opposite sides of the disk portion, as shown in Figures 7 to 12, inclusive, and the blades secured therein by bolts 45. The portions of the digger blades 39 outwardly from the portions at which they are secured to the disk hubs extend radially outward and are curved in a direction toward the forward end of the apparatus, or in the direction of rotation of said blades, as shown in Figures 2, 8 and 11, whereby as the blades are revolved with the rotation of the blades carrying hubs they penetrate into the land or ground for substantially one-third of their length, pass through the land for a portion of the revolving movement of the blades and then out of the land thereby lifting the land and effecting a breaking up and loosening of the land. The end portions of the blades at which they are secured to the hub disks are substantially flat, and the portion outwardly therefrom is of T-shape in cross section, as shown in Figure 9, and are progressively reduced in cross section or taper to a point within the tips and the tips flattened and arranged of barbed form, as shown at 46.

The shaft 40 extends through and is supported in a hollow shaft which may be a single shaft, but preferably consists of a pair of sections 47, 48, as shown in Figure 15, with a pair of abutments 49 interposed between the inner ends of said hollow shafts and retained on the shaft 40 by collars pinned on said latter shaft at the outer ends of the hollow shafts, as shown at 50, the hollow shafts being journaled in bearings 51 mounted on the sub-frame 41. The digger blade carrying hubs 42 are loosely mounted on the hollow shafts to have rotative adjustment one relative to the other and to be connected to rotate the hubs one from the other and operatively connect and rotate the hubs in unison with the hollow shafts. For this purpose the ends of the tubular or sleeve portions 44 of the hubs are arranged as a jaw clutch member and the jaw clutch members of adjacent hubs are adapted to be engaged to couple the hubs together, as shown at 52 in Figures 7, 10 and 15. The tubular or sleeve portions 44 at the inner end of the inner hubs are removed, as shown at 53 in Figure 15, and said ends of the hubs abutting the ends of a longitudinally split grease retaining and dust excluding member 54 engaged over the abutments 49 and the inner ends of the tubular shafts. The digger blade carrying hubs are retained in assembled relation and coupled together by the jaw clutch members 44 of adjacent hubs by a sleeve 55 keyed to the hollow shafts at the outer end of the outermost digger blade carrying hubs, one end of said sleeves being arranged as a jaw clutch member to engage the clutch jaws on the outer tubular portion of said outer hubs and thereby coupling the digger blade carrying hubs to the hollow shafts to rotate therewith. The outer ends of the sleeves 55 engage in an annular recess in the end of the bearings 51, the outer annular wall of said recesses serving to retain lubricant in and exclude dust from the bearings. The hollow shafts 47, 48 are rotated from the drive shaft 27 by sprocket chains 56 passing around sprocket wheels 57 fixed on or keyed to the end portions of the drive shaft 27 and sprocket wheels 58 keyed to the end portions of the hollow shafts 47, 48 extending outwardly from the bearings 51, as shown in Figure 15.

To facilitate breaking and loosening of the land by the digger blades, means are provided to cut or slice the land in the direction of the revolving movement and travel of the digger blades and also cut vegetation, such as a cover crop, stalks and trash. As shown, said means consists of disk cutters 59 engaged upon a tubular portion 44 of the digger blade carrying hubs 42 extending from the side of the hub disks and in recesses in the hub disks and side of the digger blades.

The disk cutters are secured to the disk portion of the hubs by the bolts 45 securing the digger blades to the hub disks, the heads of the bolts being recessed into said disk cutters and the nuts on the bolts recessed into the hub disks. The cutter disks are of less diameter than the circle circumscribed by the digger blades.

During the digging operation of the digger blades 39 and disk cutters 59, soil and other material will adhere to and accumulate on the digger blades and disk cutters, particularly so if the ground is moist, which may interfere with the efficient operation of the land breaking and loosening means. Means are, therefore, provided to remove from the disk portion of the hub members, the cutter disks and digger blades any such material adhering thereto. As shown, said means comprises scrapers 59', 60' of curved form in longitudinal section suspended from bolts 61 between split clamping collars 62 mounted on a shaft 63 fixed to the side frame members 23 and extending transversely of the frame or supporting structure, the bolts also serving to clamp the scraper carrying collars to said shaft. The scrapers extend downwardly to one side of the tubular portions 44 of the digger blade carrying hubs, the scrapers 59' being disposed relative to the cutter disks 59 and having a straight edge 64 opposed to said cutter disks and a side of the digger blades. The other scrapers 60' are disposed at the side of the hub disks 42 opposite the disk scrapers 59' and having an offset straight edge portion 65, one of which edge portions is opposed to the hub disks and the other portion opposed to the opposite side of the digger blades, as shown in Figures 7 and 8. The scraper carrying collars 62 are of a length to provide spaces between adjacent collars to permit of adjustment of the collars longitudinally on the shaft 63, and the scrapers toward and away from the disk cutters 59, the disk portion of the hubs and the digger blades. Material, particularly vegetation, may accumulate on the outer end portions of the digger blades, and means are provided to remove the same from the digger blades. As shown, said means comprises beater blades 66 circumferentially spaced about and extending radially from hubs 67 fixed on and spaced longitudinally of a shaft 68 (Figures 8, 10 and 11) extending transversely of the frame and journaled in bearing members 69 fixed to the side members 23 of the frame. The beater blade carrying shaft is rotated from the digger blade carrying shafts 47, 48 by sprocket chains 70 passing around sprocket wheels 71 fixed on the shafts 47, 48 and sprocket wheels 72 fixed on the beater blade carrying shaft 68, as shown in Figures 10 and 11. The beater blades 66 are spaced along the shaft 68 to revolve in paths intermediate the paths of movement of the digger blades 39, as shown in Figure 10, and the beater blades are curved in a direction reverse to the curvature of the digger blades, as shown in Figures 8 and 11.

To facilitate breaking and working of stubble land, or land having a cover crop, such as oats, rye or other vegetation to constitute green manure, means are provided to lay such vegetation over the ground and cut the same into relatively small size and thus facilitate not only the breaking of the land but also the mixing of the cut vegetation with the land by the land breaking and loosening action of the digger blades, said means comprising cutter means revoluble in a circular path about a horizontal axis of a support extending transversely of the tractor frame forwardly of the digger blades. As shown in Figures 5 and 6 one of said cutter means comprises a shaft 73 journaled in bearings fixed on the side members of the sub-frame 41 forwardly of the bearings for the digger blade carrying shaft 40. Spiders 74 including a hub with arms extending radially therefrom and equidistantly spaced about the same are mounted on and rotatable with the shaft 73 adjacent each end thereof, and one or more of such spiders may be mounted on the shaft equidistantly spaced from the end spiders and each other. Cutting blades 75 are releasably mounted on the ends of the spider arms with the cutting edge portion of the cutting blades projecting from the end of the spider arms, as shown in Figures 5 and 6, and extending longitudinally and parallelly of the spider carrying shaft 73. To reinforce the end portion of the spider arms relative to which the cutting blades are mounted, the spider arms are made of increased thickness at the ends for which purpose one surface 76 of the spider arms is flat and extends to the end of the arms, and the other surface of the arms has a portion extending inwardly from the free end and diverging from said surface 76 and merging with a portion converging in a direction toward the spider arms, as shown at 77 in Figure 5. The cutting blades are juxtaposed to the flat side of the end portion of increased thickness of the spider arms by clamping members 78 conforming in shape in longitudinal section to the portion 77 of increased thickness of the spider arms and secured to said arms. The flat surface of the clamping members is recessed for the engagement of the cutting blades, said recesses extending inwardly from the end of the clamping members to an extent slightly greater than one-half the width of the cutting blades and of a depth slightly less than the thickness of the cutting blades, as at 79. The cutting blades are clamped between said recessed portion and the flat surface of the spider arms with the cutting edge portion of the cutting blades projecting form the end of the spider arms by bolts 80, the head and nuts of which bolts are disposed within recesses in the portion of increased thickness of the spider arms and the clamping members, as shown in Figure 5.

The vegetation cutter means 74, 75 rotates in a forward direction and the cutting blades during the cutting operation penetrate more or less into the surface of the land with the result that soil, particularly if the land is moist, and cut vegetation will accumulate upon and between the cutting blades and interfere with the cutting of the vegetation by the cutter means. Means are provided to remove from the cutter means soil or other material accumulating thereon rendered operative by the accumulation of such material on the cutter means. For this purpose, inwardly compressible and outwardly expansible means are carried by the cutter means disposed in the space between the spider arms adapted to be compressed by material as it accumulates on the cutter means during the cutting operation and to expand as the cutting blades move out of cutting position and operate to remove the material from the cutter means. This means, as shown in Figures 5 and 6, comprises U-shaped yielding members 81 of resilient flat material fixed at one end, as by riveting, to projections extending from one side of the spider arms, as at 82, and disposed with the U portion of the members 81 extending toward each other, and the other end of said members disposed above the end portion fixed to the arm projections 82, as shown in Figure 6. Plates 83 extend between yielding members 81 carried by adjacent spider arms and are fixed to the upper end of said yielding members, as by riveting, as shown at 84, the plates 83 being normally disposed in line with and of a length equal to the cutting blades and of slightly less width than the distance between the outer surface of the clamping members 78 and of the portion of increased thickness 77 of the spider arms, as shown in Figure 5. As the cutting blades 75 cut the vegetation and penetrate into the land, the soil and cut vegetation accumulating on or between the cutting blades will exert a force on the plates 83 acting to compress and increase the tensional stress of the resilient supporting members 81 which acts as the cutting blades move out of cutting position to exert a resilient outward force on the plates 83 to move said plates outwardly and remove material accumulated on and between cutting blades.

In Figures 13 and 14, there is shown a modified form which may comprise the preferred form of the cutter means for cutting a cover crop and other vegetation. The cutter means is substantially the same as that shown in Figures 5 and 6 except that the cutting blades 75 are of spiral form, and to mount the cutting blades on the spider arms 74, the spiders are mounted on the carrying shaft 73 with the spider arms of successive spiders offset circumferentially relative to the spider arms of a preceding spider and thus accommodating the spider arms to the pitch of the cutting blades. The spider arms also carry the resilient supports 81 for the plates 83 disposed between the spider arms and operative for removing from the cutting blades soil and cut vegetation accumulated on and between the cutting blades.

To assure a thorough fine cutting of the vegetation and the mixing of the cut vegetation with the soil, there is provided additional cutter means to successively cut the vegetation cut by the cutting blades 75 transversely of the cut made by the blades 75. This additional cutter means comprises a series of sets or groups of cutting disks 171, each set or group comprising three disks rotatably mounted on a shaft 172 carried by yoke members or brackets 173 with a disk on the outside of each leg portion of the yoke and a disk between the leg portions, as shown in Figure 16. The yoke or fork members 173 are shown as three in number but a less or greater number may be provided and are pivotally suspended from collars 174 loosely engaged on a shaft 175 rotatably mounted at the opposite end portions in bearings 176 on the side members of the sub-frame 41 between the bearings 51 and the bearings for the shaft 73. The collars 174 are releasably secured in spaced relation to each other by set screws 177 to permit adjustment of the collars on the shaft 175 toward and away from each other. The pivotal mounting of the yokes 173 on the collars 174 will permit the disks 171 to assume a canted position relative to the land L, and to limit said canting movement and assure that all the disks will assume substantially the same canted position, the yokes 173 are connected together by links 178. The disks 171 in vegetation cutting position will enter the land for approximately one-fourth of their diameter, as shown in Figures 16 and 17, so that the disks will loosen and break up the land while cutting the vegetation cut by the blades 75, and said disks will accumulate cut vegetation and soil thereon. Such accumulation is removed from the disks by scrapers 179 mounted on each side of a disk 171 above the shafts 172 by brackets 180, 181, the brackets 180 being fixed intermediate their ends to the leg portions of the yokes 173 and the brackets 181 fixed at one end to the brackets 180, as shown in Figure 16. The scrapers 179 are carried at the free ends of the brackets 180, 181. The disks 171 are adapted to be adjusted into and out of vegetation cutting and land loosening position by the rotation of the shaft 175 through the longitudinal actuation of a rod 182 pivotally connected at one end to an arm 183 fixed to an end portion of the shaft 175 extending from a bearing 176 and the opposite end of the rod 182 operatively connected to a lever 184 pivotally supported on an upper side frame member 22 and carrying a manually operative and spring influenced latch 185 mounted to have movement longitudinally of the lever and engage a tooth space of an arcuate rack 186 fixed upon the frame member 22, whereby the disks 171 are retained in adjusted position.

The tractor frame is adapted to be supported with the land breaking and loosening or digging means 39 and vegetation cutter means 75, 171 out of engagement with the land and propelled by the traction wheels 33, or is adapted to be supported and propelled by the digging means during the digging operation. For this purpose, the frame with the digging means and vegetation cutter means and the traction wheels are adapted to be raised and lowered relative to each other. Assuming the frame is lowered with the digging means supporting the frame, as shown in full lines in Figure 2, and it is desired to raise the frame and lower the traction wheels to tractionally support the frame by the wheels with the digging means and vegetation cutter means out of engagement with the land, as shown in dot and dash lines in Figure 4, means are provided to raise and lower the traction wheels. These means comprise links 85 pivotally connected at one end to the traction wheel carriers 35 and said links pivotally engaged at the opposite ends upon the end portions of a rod or bar 86 pivotally carried at one end of a pair of arms 87 fixed at the opposite ends on the opposite ends of a shaft 88 rotatably supported in bearings 89 mounted upon the upright members 24 of the frame extending between the upper and lower side frame members 22, 23. A pair of cables 90 are attached at one end to clevises 86' engaged upon the rod 86 between the arms 87 and links 85, one cable passing around and being guided by peripherally grooved wheels 91, 92 to and attached at the opposite end to a drum 93 loose on the drive shaft 27, and the other cable passing around and guided by wheels 94, 95 to and attached at the opposite end to said drum 93, Figure 3. The drum 93 is adapted to be coupled to and rotate with the drive shaft 27 for which purpose one end of the drum hub extends from one end of the drum and is arranged as a jaw clutch member 96, and a cooperating clutch member 97 is keyed on the drive shaft to rotate with and have sliding movement on said shaft whereby to move said clutch member into and out of engagement with the clutch member on the drum hub. To actuate the clutch member 97, there is provided an angle lever 100 supported, as at 98, to have pivotal movement on a vertical axis on a bracket 99 fixed on and extended inwardly from a top side member 22 of the tractor frame. The bracket 99 also rotatably supports the cable guiding wheels 92, 95. One arm of the lever 100 is bifurcated with the bifurcation legs disposed above and below the clutch member 97, and each of said legs carrying a pin to engage an annular recess 101 in said clutch member. The other arm of the lever 100 is pivotally connected to one end of a rod 102 pivotally connected at the opposite end to an arm 103 fixed on and extending downwardly from a shaft 104 rotatably supported at one end in a bearing in a bracket 105 supported by the frame and the opposite end rotatably supported in a bearing of a bracket 106 mounted upon a top side member 22 of the tractor frame, and said shaft having a foot actuated lever 107 fixed thereon. To couple the cable drum 93 to the drive shaft 27 to rotate the drum to wind the cables thereon, the foot lever 107 is actuated forwardly and downwardly and when the frame is raised to its uppermost position the rod 86 by the forward movement thereof is engaged in a recessed or hooked portion intermediate the ends of a pair of latches 108 pivotally supported at one end to extend upwardly on the upper side members of the tractor frame when the foot actuated clutch lever 107 is released. The latches 108 are urged into engaging relation with the rod 86 by a spring 109 interposed between the latches and the frame.

To lower the frame to engage the land digging means and the vegetation cutter means into engagement with the land and effect raising movement of the traction wheels, the holding latches 108 are moved out of engagement with the rod 86. For this purpose, links 110 are pivotally connected at one end to the upper end of the latches and the opposite end of the links pivotally connected to the ends of a shaft 111 rotatably supported at one end in the bracket 106 and rotatably supported at the opposite end in a bearing 112 mounted upon an upper side member 22 of the tractor frame, and said shaft rotated to actuate the latches out of engagement with the rod 86 by a foot operated lever 113 fixed on said shaft 111. To prevent sudden lowering movement of the tractor frame and a sudden engagement of the land digging blades with the land and the possibility of breaking the same, means are provided to effect a gradual lowering of the frame, and as shown comprises brake mechanism including a brake drum arranged at one end of the cable drum 93, as at 114, with a brake band 115 engaging about said portion 114 of the drum with one end of the band connected to a pin 116 extending laterally from one arm of a lever 117 pivotally supported on a stud fixed in and extending laterally from the bearing 32 for the drive shaft 27, and the opposite end of the brake band connected to a pin 118 extending laterally from the other arm of the lever 117. The lever is connected to the shaft 111 carrying the foot actuating lever 113, which constitutes a brake actuating pedal, by a rod 119 pivotally connected at one end to the lever 117 and at the opposite end to an arm 120 fixed on the shaft 111. During the initial movement of the brake pedal 113, the holding latches 108 through their connections with the shaft 111 are moved out of engagement with and release the rod 86 when the weight of the frame will tend to cause it to assume a lowered position. To retard and effect a gradual lowering movement of the tractor frame, the brake pedal 113 is further actuated to frictionally engage the brake band 115 with the drum 114. The frame may be lowered to such an extent relative to the traction wheels that said wheels are out of engagement with the ground in operative land engaging position of the diggers and should the frame be raised due to the diggers engaging and riding over an obstruction the traction wheels will engage with the ground and partially support the frame, the greater portion of the weight of the tractor section however being supported by the digging blades and vegetation cutter means to permit the digging blades to penetrate the land for substantially two-thirds of their length and move the digging blades through and out of the land during the revolving movement thereof and thus serve to propel the tractor section and the trailer section connected thereto.

By the construction and arrangement of the agricultural apparatus for breaking and tilling land preparatory to seeding the land in the raising of crops, the land is broken up and loosened very efficiently, whereas heretofore by the use of a conventional plow a slice of land of from ten to twelve inches in depth is turned over upon itself and in the case of a cover crop on the land to be used as green manure, or humus spread upon the land, is buried in the land to a depth of from ten to twelve inches resulting in a slow disintegration of the green manure or humus and before a growing crop can receive any benefit therefrom it is necessary that the roots first grow sufficiently to reach such manure or humus. By the present apparatus, the land is broken up and loosened for a depth of from ten to twelve inches, and while the digger blades effect mixing of the cut cover crop, or humus spread upon the land, such mixing is effected by the digger blades only for a depth of from three to six inches from the surface of the land, and the subsequent harrowing of the land effects a working of the land and mixing therewith of fertilizer, green manure and/or humus for a depth not greater than six inches, thus forming the land and fertilizer as a mulch for substantially said depth and as such mulch is subjected to alternate moistening, as by rain, and drying there is effected a quick disintegration of the green manure and/or humus which is made readily accessible to the roots of a growing crop and effecting a quicker maturing and better crop.

The arms 87 fixed on the shaft 88 and the connection of said arms with the rod or bar 86, as well as the links 85 connecting said rod 86 with the traction wheel carrying arms 35, the latches 108 and the connection of the latches with the links 110 connecting the latches to the pedal shaft 111, which are disposed at opposite sides of the seat S for the operator, may be enclosed by protecting hoods H, as shown in Figures 1 and 2.

It will be obvious that various modifications may be made in the construction and arrangement of the parts, and come within the scope of the invention, and that portions of the invention may be used without others without departing from the scope of the invention.

Having thus described my invention, I claim:

1. Apparatus for breaking and working land, a frame, a drive shaft journaled on the frame, a shaft rotatably supported by and extending transversely of the frame operatively connected to and rotated from the drive shaft, circumferentially spaced digger blades spaced longitudinally of and rotatable with said second shaft operative by the rotation thereof to penetrate and move through and not of the land, a pair of traction wheels, means to connect the traction wheels to the frame and permit of raising and lowering movements of the frame and traction wheels relative to each other, means connected to the means connecting the traction wheels to the frame and operative from the drive shaft to raise the frame and lower the traction wheels and support the frame by the traction wheels with the digger blades out of engagement with the land, and lower the frame and raise the traction wheels to support the frame by the digger blades and limit the penetration of the digger blades to a predetermined depth into the land.

2. In apparatus for breaking and working land, a frame, power means carried by the frame, a drive shaft journaled on the frame and operatively connected to and rotated from the power means, digger means rotatably carried by the frame below and operatively connected to and rotatable from the drive shaft, a pair of traction wheels operatively connected to and rotated from the drive shaft, arms disposed at the opposite sides of the frame rotatably carrying the traction wheels at one end thereof and pivotally connected at the opposite end to the frame to have movement on an axis transverse of the frame, and means to raise the frame and lower the traction wheels, comprising a rotatable shaft extending transversely of the frame rearwardly of and in a plane above the axis of rotation of the traction wheels in all positions of said wheels, and arms mounted at one end on the opposite end portions of and extending upwardly from said latter shaft, a rod loosely carried by the opposite ends of said arms, links pivoted at one end on said rod and at the opposite end pivotally connected to the traction wheel carrying arms, a drum loose on the drive shaft, cables connected at one end to said rod and guided to and connected at the opposite ends to said drum, clutch mechanism operative to connect and rotate the drum from the drive shaft to wind the cables thereon to raise the frame and lower the traction wheels, and latches adapted to engage the rod and support the frame by the traction wheels in its raised position.

3. In apparatus for breaking and working land as claimed in claim 2, means to lower the frame relative to the traction wheels to engage and support the frame by the digger means upon the land and cause said digger means to penetrate and break the land comprising a brake associated with the cable drum, a lever connected to and operative to release the latches from the frame holding means and actuate the brake to control the lowering movement of the frame.

4. In apparatus for breaking and working land, a frame, power means carried by the frame, a drive shaft journaled on the frame and operatively connected to and rotated from the power means, digger means rotatably carried by the frame below and operatively connected to and rotatable from the drive shaft, a pair of traction wheels operatively connected to and rotated from the drive shaft, arms disposed at the opposite sides of the frame rotatably carrying the traction wheels at one end thereof and pivotally connected at the opposite end to the frame to have movement on an axis transverse of the frame, means connected to the arms to raise the frame and lower the traction wheels, and means to connect and actuate said frame raising and traction wheel lowering means from the drive shaft.

5. In apparatus for breaking and working land, a frame, traction wheels, means rotatably carrying the traction wheels pivotally connected to the frame and adapted for raising and lowering of the frame and traction wheels relative to each other, digger blades rotatably carried by the frame, cutter disks associated with the digger blades and of less diameter than the circle circumscribed by the revolving movement of the digger blades to cut the land into strips, cutter means for cutting a cover crop and other vegetation rotatably carried by the frame, and means to operatively engage the digger blades with the disk cutters and vegetation cutter means with the land and raise said digger blades with the disk cutters and vegetation cutter means out of engagement with the land.

6. Apparatus for breaking and working land as claimed in claim 5, wherein the cutter means for cutting a cover crop and other vegetation, comprises a rotatable shaft, cutting blades mounted on the shaft to extend longitudinally thereof and spaced radially from and circumferentially about the axis of the shaft, and yielding means carried by the cutter means in the spaces between and within the cutting blades to have inwardly and outwardly yielding movement operative for the removing of cut vegetation and other material accumulated on the cutter means.

7. Apparatus for breaking and working land as claimed in claim 5, wherein the cutter means for cutting a cover crop and other vegetation, comprises a series of cutting blades, a rotatable support mounted on the frame, the blades being mounted on the rotatable support to extend longitudinally of the support and in radial and circumferentially spaced relation to the axis of the support, yielding means carried by the blade support in the spaces between and within the cutting blades adapted to have compressible movement inwardly of the cutting blades, and plates carried by said yielding means extending longitudinally of and within the cutting blades adapted to compress the yielding means by the accumulation of cut vegetation and other material on the cutting blades during the cutting operation and movement of said plates outwardly by the yielding means removing said accumulated vegetation and other material from the cutting blades during the movement of the cutting blades out of cutting position.

8. In apparatus for breaking and working land, a frame, traction wheels adjustably mounted on the frame, digger means rotatably carried by the frame, a series of cutting blades rotatably supported by the frame in advance of the digger means and extending transversely of the frame to cut a cover crop and other vegetation, a series of cutting disks rotatably carried by the frame between the cutting blades and digger means with the disks extending longitudinally of the frame to successively cut the cover crop and other vegetation cut by the cutting blades transversely of the cut made by the cutting blades, and means to adjust the traction wheels into engagement with the land to support the frame and position the digger means and the cutting blades and disks out of engagement with the land, and adjust the traction wheels out of engagement with the land and position the digger means and the cutting blades and disks into operative engagement with the land with the digger means supporting the frame.

9. Apparatus for breaking and working land as claimed in claim 8, wherein the series of cutting disks are adjustably mounted, and means to adjust the cutting disks out of and into engagement with the land independently of the adjustment of the traction wheels.

10. Apparatus for breaking and working land as claimed in claim 8, wherein the cutting disks enter the land to approximately one-quarter of the diameter of said disks when the traction wheels are adjusted out of engagement with the land.

11. In apparatus for breaking and working land, a frame, traction wheels adjustably mounted on the frame, a shaft rotatably supported by the frame, a series of yoke members adjustably mounted on the shaft and pivoted on an axis extending transversely of the shaft and pivotally connected to each other, a series of cutting disks rotatably carried by the yoke members, means carried by the frame and connected to the shaft to rotate the shaft and adjust the cutting disks into and out of engagement with the land, digging means rotatably carried by the frame to the rear of the shaft, and means carried by the frame and connected to the traction wheels to adjust the traction wheels into traction engagement with the land to support the frame with the digging means and cutting disks out of engagement with the land, and adjust the traction wheels out of engagement with the land and position the digging means and cutting disks into operative engagement with the land with the digging means supporting the frame.

12. In apparatus for breaking and working land as claimed in claim 11, scrapers carried by the yoke members to engage opposite sides of the cutting disks above the axis of rotation of said disks and remove material from said disks.

HARRY G. TRAVER.

REFERENCES CITED

The following references are of record in the file of this patent:

UNITED STATES PATENTS

| Number | Name | Date |
|---|---|---|
| 1,301,043 | Dougherty | Apr. 15, 1919 |
| 1,343,866 | Greene | June 15, 1920 |
| 1,916,330 | Nordstrom | July 4, 1933 |
| 2,007,646 | Gilbertson | July 9, 1935 |
| 2,066,610 | Carlin | Jan. 5, 1937 |
| 2,164,845 | Steed et al. | July 4, 1939 |